US007908340B2

(12) United States Patent
Cianciarulo et al.

(10) Patent No.: US 7,908,340 B2
(45) Date of Patent: *Mar. 15, 2011

(54) METHODS AND APPARATUS FOR PROVIDING COVERAGE FOR SENDER OF TRANSMISSION DATA

(75) Inventors: Krys Cianciarulo, Maplewood, MN (US); Stephen C. Cardot, Eagan, MN (US); Thomas Weiseth, Bloomington, MN (US)

(73) Assignee: TranSurety, LLC, Minneapolis, MN (US)

( * ) Notice: Subject to any disclaimer, the term of this patent is extended or adjusted under 35 U.S.C. 154(b) by 479 days.

This patent is subject to a terminal disclaimer.

(21) Appl. No.: 11/758,579

(22) Filed: Jun. 5, 2007

(65) Prior Publication Data

US 2008/0046540 A1 Feb. 21, 2008

Related U.S. Application Data

(60) Division of application No. 11/755,639, filed on May 30, 2007, now Pat. No. 7,555,535, which is a division of application No. 11/753,550, filed on May 24, 2007, now Pat. No. 7,349,954, which is a division of application No. 11/348,035, filed on Feb. 4, 2006, now Pat. No. 7,246,157, which is a division of application No. 10/922,322, filed on Aug. 19, 2004, now Pat. No. 7,020,692, which is a continuation of application No. 10/094,591, filed on Mar. 7, 2002, now Pat. No. 6,922,720, which is a continuation of application No. PCT/US00/18276, filed on Jun. 30, 2000.

(60) Provisional application No. 60/153,475, filed on Sep. 10, 1999.

(51) Int. Cl.
*G06F 15/16* (2006.01)

(52) U.S. Cl. ........ 709/217; 709/203; 709/219; 709/227; 709/237; 705/51

(58) Field of Classification Search .......... 709/201–203, 709/217–219, 223–224, 227–228, 237; 707/9–10; 705/51–53

See application file for complete search history.

(56) References Cited

U.S. PATENT DOCUMENTS 4,831,526 A 5/1989 Luchs et al.
(Continued)

FOREIGN PATENT DOCUMENTS

WO WO 9802968 1/1998
(Continued)

OTHER PUBLICATIONS

Ferguson, Kevin, "Risk E-Business", "Forbes.com, forbes.com/1999/06/11/feat.html", Jun. 1999.

*Primary Examiner* — Bharat N Barot
(74) *Attorney, Agent, or Firm* — Charles A. Lemaire; Jonathan M. Rixen; Lemaire Patent Law Firm, P.L.L.C.

(57) ABSTRACT

The present invention provides systems and methods which afford a technical application for insuring, bonding, and underwriting a transmission of a data set, streaming data, and/or document over the Internet through TCP/IP and all other electronic media such as WAP, VOIP, fiber optic channels, microwave channels, and through standard electrical switches, electrical outlets and power lines. The present invention includes a computer-readable medium having computer-executable instructions to cause a system perform a method for insuring, bonding, and/or underwriting data transmission. The method includes enabling a first remote client coupled to a communications network to insure, bond, and/or underwrite a transmission of an electronic data set, streaming data, and/or document, with a selected coverage type for a selected coverage amount, from the first remote client to one or more second remote clients. The method includes charging a fee to an appropriate account for the selected coverage type and amount.

20 Claims, 4 Drawing Sheets

U.S. PATENT DOCUMENTS

| | | | |
|---|---|---|---|
| 5,557,798 A | 9/1996 | Skeen et al. | |
| 5,615,268 A | 3/1997 | Bisbee et al. | |
| 5,745,574 A | 4/1998 | Muftic | |
| 5,918,020 A | 6/1999 | Blackard et al. | |
| 5,944,795 A | 8/1999 | Civanlar | |
| 5,982,891 A | 11/1999 | Ginter et al. | |
| 6,058,422 A | 5/2000 | Ayanoglu et al. | |
| 6,058,427 A | 5/2000 | Viswanath et al. | |
| 6,198,923 B1 | 3/2001 | Buettner | |
| 6,223,286 B1 | 4/2001 | Hashimoto | |
| 6,253,234 B1 | 6/2001 | Hunt et al. | |
| 6,377,548 B1 | 4/2002 | Chuah | |
| 6,405,177 B1 | 6/2002 | DiMattina | |
| 6,549,888 B1 | 4/2003 | Aieta et al. | |
| 6,658,568 B1 | 12/2003 | Ginter et al. | |
| 6,687,682 B1 | 2/2004 | Esfandiari et al. | |
| 6,725,401 B1 | 4/2004 | Lindhorst-Ko | |
| 6,735,569 B1 | 5/2004 | Wizig | |
| 6,922,720 B2 | 7/2005 | Cianciarulo et al. | |
| 6,944,597 B2 | 9/2005 | Callen et al. | |
| 7,020,692 B2 * | 3/2006 | Cianciarulo et al. | 709/217 |
| 7,660,772 B2 * | 2/2010 | Verkama | 705/51 |
| 7,711,646 B2 * | 5/2010 | Cianciarulo et al. | 705/52 |
| 2006/0129656 A1 | 6/2006 | Cianciarulo | |

FOREIGN PATENT DOCUMENTS

| | | |
|---|---|---|
| WO | WO 9858303 | 12/1998 |
| WO | WO 9942965 | 8/1999 |
| WO | WO 0155931 | 8/2001 |

* cited by examiner

METHODS AND APPARATUS FOR PROVIDING COVERAGE FOR SENDER OF TRANSMISSION DATA

CROSS REFERENCED RELATED APPLICATIONS

This application is a divisional under 35 USC 120 of U.S. patent application Ser. No. 11/755,639 filed May 30, 2007 (now U.S. Pat. No. 7,555,535), which is a divisional of U.S. patent application Ser. No. 11/753,550 filed May 24, 2007 (now U.S. Pat. No. 7,349,954), which is a divisional of U.S. patent application Ser. No. 11/348,035 filed Feb. 4, 2006 (now U.S. Pat. No. 7,246,157), which is a divisional of U.S. patent application Ser. No. 10/922,322 filed Aug. 19, 2004 (now U.S. Pat. No. 7,020,692), which is a continuation under 35 USC 111(a) of U.S. patent application Ser. No. 10/094,591 filed Mar. 7, 2002 (now U.S. Pat. No. 6,922,720), which is a continuation under 35 USC 111(a) of PCT/US00/18276 filed Jun. 30, 2000 (WO 01/18703), which claimed priority from U.S. Provisional Patent Application Ser. No. 60/153,475 filed Sep. 10, 1999, all of which applications are incorporated herein by reference.

FIELD OF THE INVENTION

The present invention relates generally to the field of information handling systems. More particularly, the present invention relates to systems and methods for insuring, bonding, and underwriting the electronic transmission of data, streaming data, and/or documents over the Internet.

BACKGROUND OF THE INVENTION

The Internet has become a tremendous information resource tool. Even more, the Internet is a powerful agent that will transform the way all business is transacted and the way nearly every product and service is created and sold. With countless websites, portals, and information transfer channels proliferating at an extremely rapid rate the ability to hold the Internet user's attention becomes critical. It is recognized that convenience and speed alone are not always enough. Today, the consumer is demanding an added comfort level to know that use of the Internet for conducting business is secure and reliable. Internet users who transact business over the Internet are very conscious of these security issues. In the field of on-line Internet transactions a multitude of manufacturing, retail, service companies including financial and legal service industries, health care organizations, municipal organizations and the like are transmitting their important documents over electronic communication channels. These Internet users need to know not only that their transmissions are received, but additionally that these transmissions have not been mis-received, intercepted, interfered or tampered with by outside sources or un-intended recipients.

For example, a research division of an automotive company may send confidential engineering drawings for a new product to another group of engineers at another remote site. The company wants to be certain that the drawings only arrive to the intended audience. For this purpose, the company may also desire to insure that those drawings have been securely received for liability reasons. Similarly, health care industries may desire to make a patient's confidential medical records accessible to the patient on-line. However, to do so these health care industries, and other service industries, will likely be subject to impending government regulations regarding confidentiality and privacy issues which require that such information electronically transmitted through the internet is secure. Such organizations will thus need a means to insure themselves against liability in the event security is breached.

One approach to affording confidentiality and privacy includes using various commercially available security measures for the electronic transmission of data, streaming data, and/or documents over the Internet. One form of such includes encryption software. Another security form includes the use of compression software.

Still another security form includes transmitting data over a fast optical portal, thus making the data more difficult to intercept.

Presently, not all Internet users who have to send sensitive material have access to the data security means described above. Often the software packages and/or sophisticated networks necessary to provide the same are cost prohibitive, and in some instances require extensive in-house technical support. Even more, none of the above described mechanisms provide any recourse for failure.

For the reasons stated above, and for other reasons which will be explained and described below organizations and individuals conducting business transactions and sending data, streaming data, and/or documents over the Internet need to insure, bond, and underwrite the security of the transmission and receipt of the same without incurring significant additional costs. A technical application involving systems and methods capable of resolving this need does not currently exist. Creating such systems and methods represents a technical problem to be solved.

SUMMARY OF THE INVENTION

The present invention provides systems and methods for insuring, bonding, and underwriting the transmission and receipt of data, streaming data, and/or documents, such as in Internet business transactions, without incurring significant additional costs.

Other embodiments are similarly included which will be understood by one of ordinary skill in the art upon reading this disclosure.

One particular embodiment of the present invention includes a system for insuring, bonding, and underwriting, either independently or in any combination of the three, the electronic transmission of data, streaming data, and/or documents over a communications network. The system includes a server and a remote client coupled to the server over a communications network. The system further includes software means operative on the server and the remote client. The software means is operative on the server and the remote client for enabling a user at the remote client to electronically transmit data, streaming data, and/or documents, with a selected form of coverage, e.g. insuring, bonding, and/or underwriting, all three being independently optionable or optionable in any combination thereof, from a first remote client to one or more second remote clients. The software means is further operable for charging an appropriate account a fee for the selected form of coverage.

One of ordinary skill in the art will further understand upon reading this disclosure that the system includes a computer-readable medium having computer-executable instructions to cause the system to perform a method for insuring, bonding, and/or underwriting the electronic transmission of data, streaming data, and/or documents, all three being independently optionable or optionable in any combination thereof. Thus, one method embodiment of the present invention includes enabling a first remote client coupled to a communications network to electronically transmit data, streaming data, and/or documents, with a selected form of coverage, e.g. insuring, bonding, and/or underwriting, all three being independently optionable or optionable in any combination thereof, from the first remote client to one or more second remote clients. The method further includes charging an appropriate account a fee for the selected form of coverage.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DESCRIPTION OF EMBODIMENTS

In the following detailed description, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
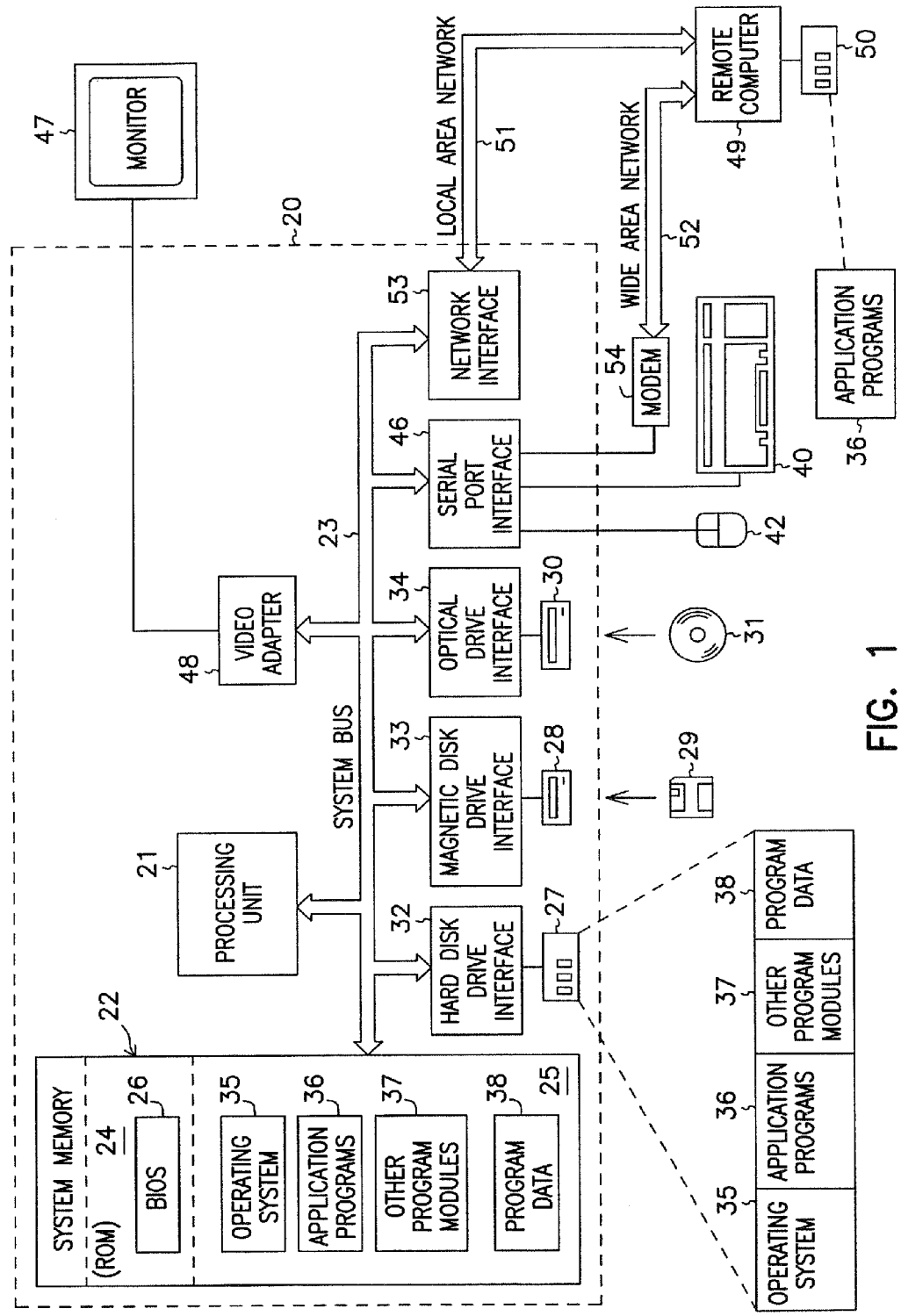
FIG. 1 is a diagram of a hardware and operating environment in conjunction with which embodiments of the invention may be practiced.

FIG. 1 is an overview diagram of a hardware and operating environment in conjunction with which embodiments of the invention may be practiced. The description of FIG. 1 is intended to provide a brief, general description of suitable computer hardware and a suitable computing environment in conjunction with which 30 the invention may be implemented. The invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I 0 remote processing devices that are linked through a communications network. In a distributed computing environment, program modules may be located in both local and remote memory storage devices.

Figure 2:
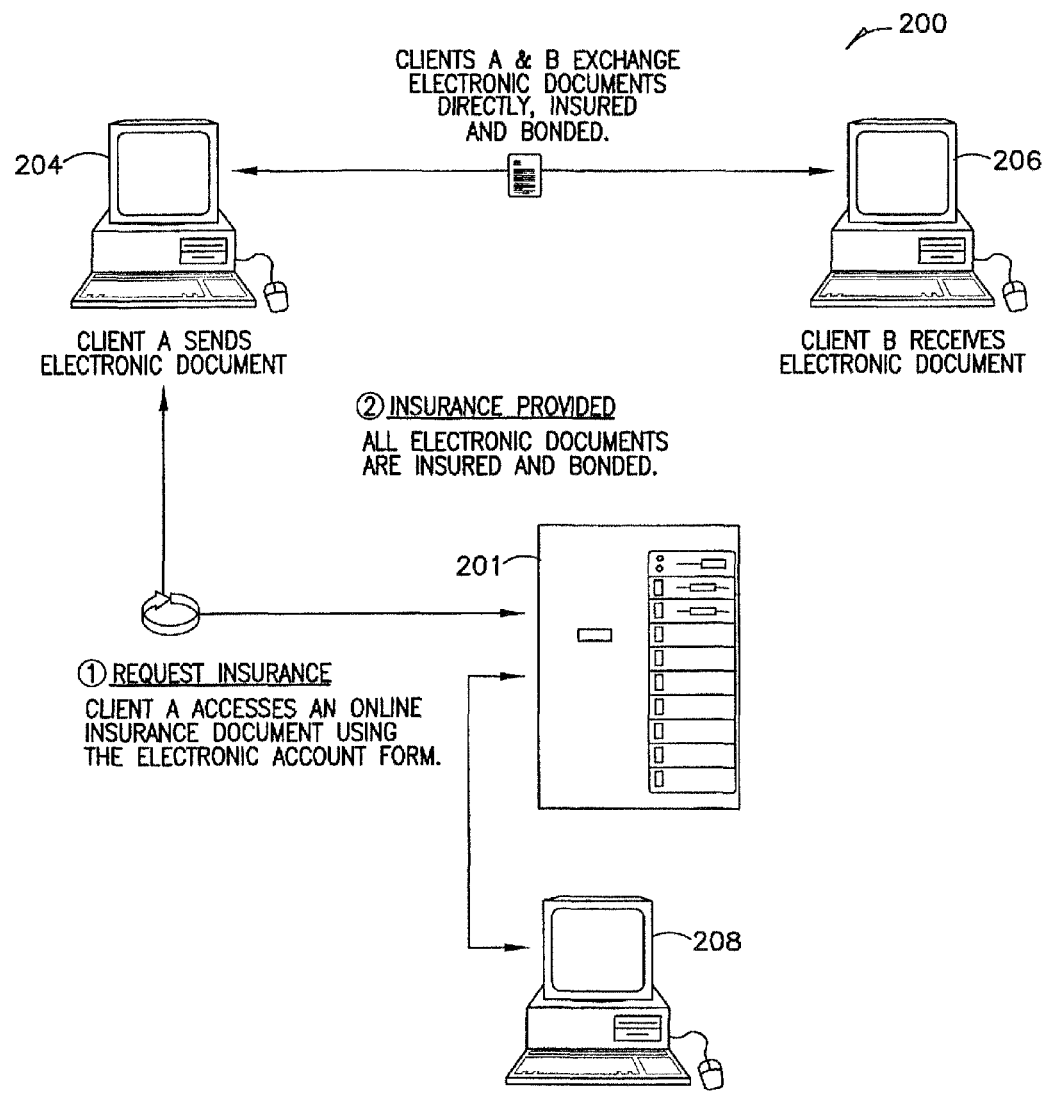
FIG. 2 is an illustration of one embodiment of a system according to the teachings of the present invention, which can be incorporated into a communications network including the Internet.
Figure 3:
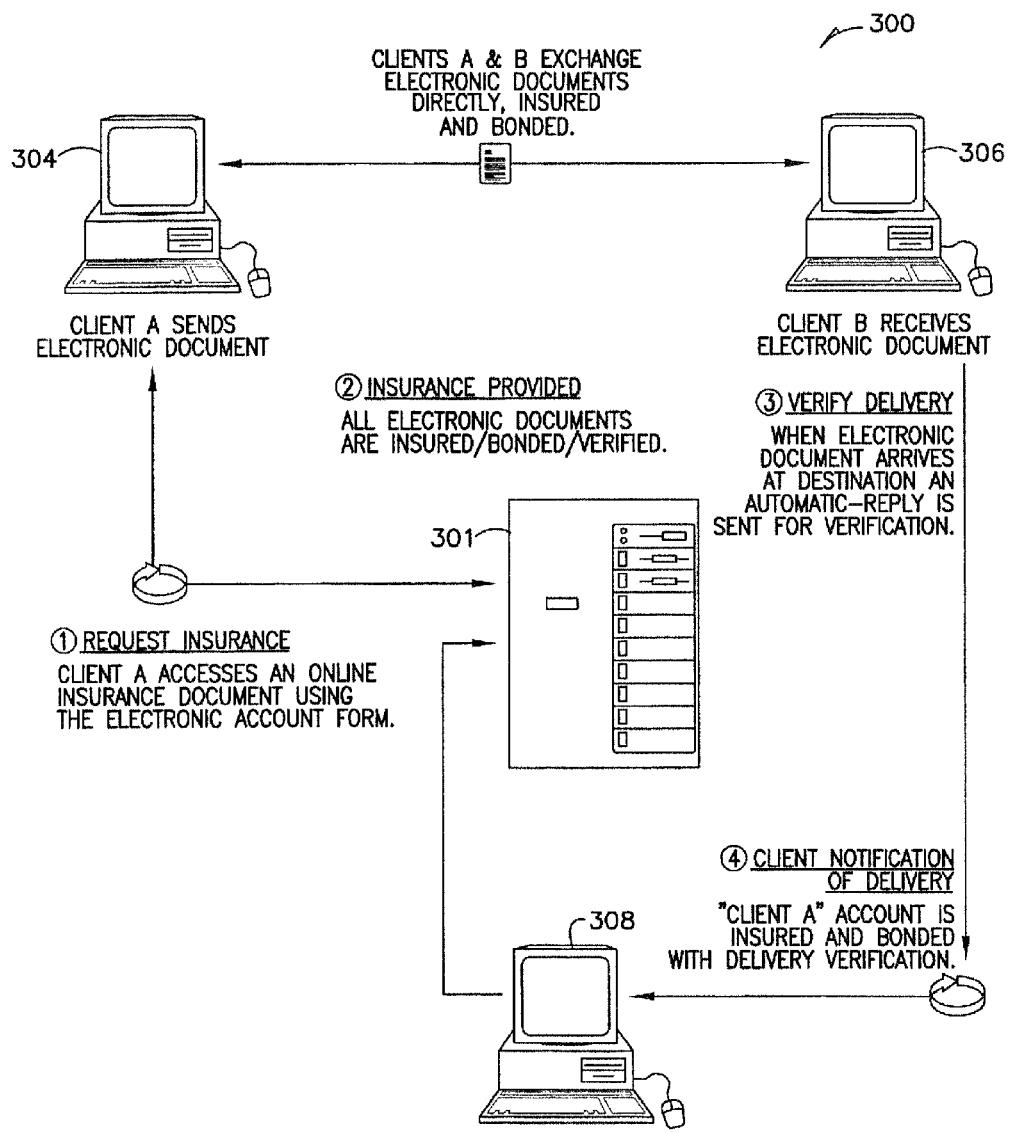
FIG. 3 is an illustration of another embodiment of a system according to the teachings of the present invention, which can be incorporated into a communications network including the Internet.
Figure 4:
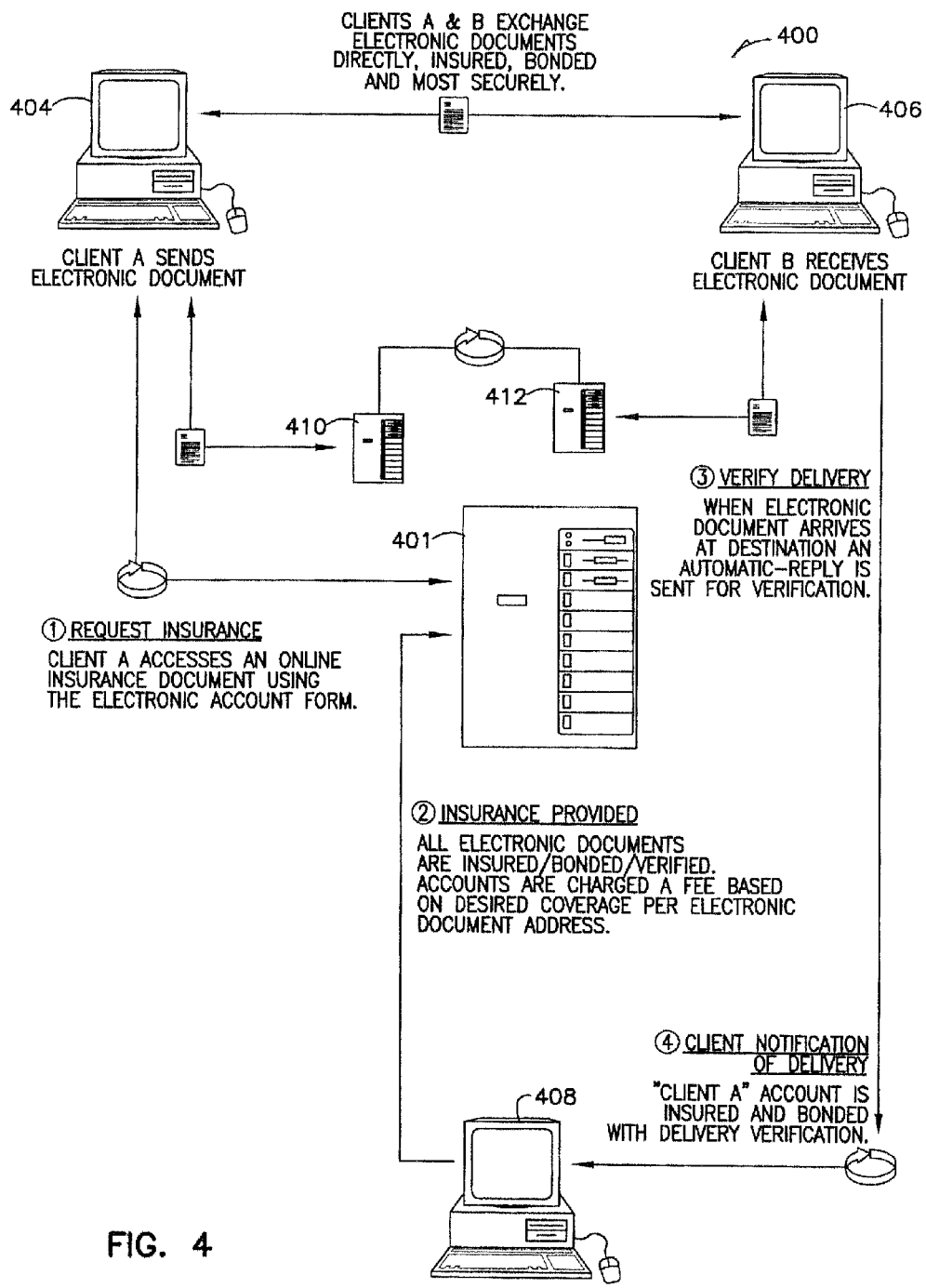
FIG. 4 is an illustration of still another embodiment of a system according to the teachings of the present invention, which can be incorporated into a communications network including the Internet.

In the embodiment shown in FIG. 1, a hardware and operating environment applicable to any of the servers and/or remote clients shown in FIGS. 2-4 is provided. As shown in FIG. 1, the hardware and operating environment includes a general purpose computing device in the form of a personal computer 20, or a server 20, including a processing unit 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 can be any of several types of bus structures including a memory bus or memory controller, a peripheral bus, and a local bus using any of a variety of bus architectures. The system memory can also be referred to as simply the memory, and includes read only memory (ROM) 24 and random access memory (RAM) 25, a basic input/output system (BIOS) 26, containing the basic routines that help to transfer information between elements within the computer 20, or a server 20, such as during start-up, may be stored in ROM 24. The computer 20, or a server 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non-volatile storage of computer-readable instructions, data structures, program modules and other data for the computer 20, or a server 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g. RAID storage devices) and the like, can be used in the exemplary operating environment.

A number of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into the personal computer 20, or server 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB), a monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 or server 20 may operate in a networked environment using logical connections to one or more remote computers or servers, such as remote computer 49. These logical connections are achieved by a communication device coupled to or a part of the computer 20, or server 20; the invention is not limited to a particular type of communications device. The remote computer 49 can be another computer, a server, a router, a network PC, a client, a peer device or other common network node, and typically includes many or all of the elements described above relative to the computer 20, or server 20, although only a memory storage device 50 and application programs 36 have been illustrated in FIG. 1. The logical connections depicted in FIG. 1 include a local area network (LAN) 51 and a wide area network (WAN) 52. Such networking environments are commonplace in office networks, enterprise-wide computer networks, intranets and the Internet, which are all types of networks.

When used in a LAN-networking environment, the computer 20, or server 20, is connected to the LAN 51 through a network interface or adapter 53, which is one type of communications device. When used in a WAN-networking environment, the computer 20, or server 20, typically includes a modem 54, a type of communications device, or any other type of communications device, e.g. a wireless transceiver, for establishing communications over the wide area network 52, such as the Internet; the invention is not so limited. The modem 54, which may be internal or external, is connected to the system bus 23 via the serial port interface 46. In a networked environment, program modules depicted relative to the personal computer 20, or portions thereof, can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3and/or OC-12, TCP/IP, microwave, WAP (wireless application protocol), and all other electronic media through standard switches, routers, outlets and power lines, as the same are known and understood by one of ordinary skill in the art. The invention is not so limited.

The hardware and operating environment in conjunction with which embodiments of the invention may be practiced has been described. The computer 20, or server 20, in conjunction with which embodiments of the invention can be practiced can be a conventional computer, a distributed computer, or any other type of computer; the invention is not so limited. Such a computer 20, or server 20, typically includes one or more processing units as its processor, and a computer-readable medium such as a memory. The computer 20, or server 20, can also include a communications device such as a network adapter or a modem, so that it is able to communicatively couple to other computers, servers, or devices.

FIG. 2 is an illustration of one embodiment of a system 200 according to the teachings of the present invention, which can be incorporated into a communications network including the Internet. For ease of illustration, the system 200 is referred to herein as an information handling system 200. One of ordinary skill in the art will understand upon reading this disclosure that the same is not intended to be limiting. The information handling system 200 includes a server 201 including a processor coupled with a computer based storage device. One of ordinary skill in the art will understand upon reading this disclosure the various, commercially available servers which include such processor and memory means. In example, the processor coupled to the computer based storage device may comprise part of a network system server. As shown in FIG. 2, the server 201 is accessible over a network connection by a remote client 204, e.g. client A, having a client program or software means operable thereon and a graphical user interface. Remote client 204 further couples to a recipient client 206, or target, e.g. client B, to whom remote client 204 intends to electronically transmit a data set, streaming data, and/or document. As one of ordinary skill in the art will understand upon reading this disclosure, remote client 204 is coupled to recipient client 206 over a network connection and can access remote client 206 via means such as a uniform resource locator (URL) address. In one embodiment, the information handling system 200 may be part of a larger network system which is coupled to any number of remote/recipient clients over a local area network (LAN), e.g. an Ethernet network. In an alternative embodiment, the remote/recipient clients can be coupled to the information handling system 200 over a wide area network (WAN). Also the remote/recipient clients, 204 and 206 can be coupled to one another and the server 201 in the information handling system 200 over the public switched telephone network (PSTN), over a WAP network, e.g. rf and satellite microwave, over the Internet or any combination of the same. In this description, two remote clients are discussed, e.g. sending remote client 204 and recipient client 206. However, one of ordinary skill in the art will understand upon reading this disclosure that sending client 204 can be coupled to one or more recipient remote clients for transmitting to many remote clients at once versus strictly a one to one relationship.

The information handling system 200 can further include a mainframe computer as the same are known and understood by one of ordinary skill in the art. The information handling system 200 includes a computer with a computer-readable medium having computer-executable instructions to cause the computer to perform methods according to the teachings of the present invention. The computer-readable medium and computer-executable instructions include software for interpreting and executing the computer-executable instructions. One of ordinary skill in the art will understand the various programming languages and protocol, including object oriented programming and TCP/IP, which can be employed for the same. The invention is not so limited. The information handling system may further include network connections to printers and other peripheral devices 208 as the same are known and understood by one of ordinary skill in the art.

FIG. 3 is an illustration of another embodiment of a system 300 according to the teachings of the present invention, which can be incorporated into a communications network including the Internet. The embodiment of system 300 is intended to incorporate a delivery verification function of the present invention as described in more detail below. For ease of illustration, the system 300 is again referred to herein as an information handling system 300. One of ordinary skill in the art will understand upon reading this disclosure that the same is not intended to be limiting. The information handling system 300 includes a server 301 including a processor coupled with a computer based storage device. One of ordinary skill in the art will understand upon reading this disclosure the various, commercially available servers which include such processor and memory means. In example, the processor coupled to the computer based storage device may comprise part of a network system server. As shown in FIG. 3, the server 301 is accessible over a network connection by a remote client 304, e.g. client A, having a client program or software means operable thereon and a graphical user interface. Remote client 304 further couples to a recipient client 306, or target, e.g. client B, to whom remote client 304 intends to electronically transmit a data set, streaming data, and/or document. Alternatively, as one of ordinary skill in the art will understand upon reading this disclosure, the remote client 304 can intend strictly to make the data set, streaming data, and/or document(s) stored at remote client 304 accessible by remote client 306. As one of ordinary skill in the art will understand upon reading this disclosure, remote client 304 and remote client 306 are coupled to one another over a network connection and can access one another via address means, such as a uniform resource locator (URL) address. In one embodiment, the information handling system 300 may be part of a larger network system which is coupled to any number of remote clients over a local area network (LAN), e.g. an Ethernet network. In an alternative embodiment, the remote clients can be coupled to the information handling system 300 over a wide area network (WAN). Also the remote/recipient clients, 304 and 306 can be coupled to one another and the server 301 in the information handling system 300 over the public switched telephone network (PSTN), over a WAP network, e.g. rf and satellite microwave, over the Internet or any combination of the same. Again, in reference to FIG. 3, only two remote clients are discussed, e.g. sending remote client 304 and recipient client 306 in order to provide an easier illustration. However, one of ordinary skill in the art will understand upon reading this disclosure that sending client 304 can be coupled to one or more recipient remote clients for transmitting to many remote clients at once versus strictly a one to one relationship.

The information handling system 300 can further include a mainframe computer as the same are known and understood by one of ordinary skill in the art. The information handling system 300 includes a computer with a computer-readable medium having computer-executable instructions to cause the computer to perform methods according to the teachings of the present invention. The computer-readable medium and computer-executable instructions include software for interpreting and executing the computer-executable instructions. One of ordinary skill in the art will understand the various programming languages and protocol, including object oriented programming and TCP/IP, which can be employed for the same. The invention is not so limited. The information handling system may further include network connections to printers and other peripheral devices 308 as the same are known and understood by one of ordinary skill in the art.

In the embodiment shown in FIG. 3, the peripheral devices 308 coupled to server 301 are also accessible by remote client 306 over a network connection such that electronic data/documents can be communicated to and/or between remote client 306 and the peripheral devices 308 coupled to server 301. As one of ordinary skill in the art will understand upon reading this disclosure, remote client 306 and the peripheral devices 308 coupled to server 301 can access one another via means such as a uniform resource locator (URL) address.

FIG. 4 is an illustration of yet another embodiment of a system 400 according to the teachings of the present invention, which can be incorporated into a communications network including the Internet. The embodiment of system 400 is intended to incorporate a duplication and replication function of the present invention as described in more detail below. For ease of illustration, the system 400 is again referred to herein as an information handling system 400. One of ordinary skill in the art will understand upon reading this disclosure that the same is not intended to be limiting. The information handling system 400 includes a server 401 including a processor coupled with a computer based storage device. One of ordinary skill in the art will understand upon reading this disclosure the various, commercially available servers which include such processor and memory means. As shown in FIG. 4, the server 401 is accessible over a network connection by a remote client 404, e.g. client A, having a client program and a graphical user interface. Remote client 404 further couples to another remote client 406, or alternatively stated a recipient client 406, or target, e.g. client B, to whom remote client 404 intends to electronically transmit a data set, streaming data, and/or document. Alternatively, as one of ordinary skill in the art will understand upon reading this disclosure, the remote client 404 can intend strictly to make a set of data/document stored at remote client 404 accessible by remote client 406. As one of ordinary skill in the art will understand upon reading this disclosure, remote client 404 and remote client 406 are coupled to one another over a network connection and can access one another via means such as a uniform resource locator (URL) address.

In one embodiment, the information handling system 400 may be part of a larger network system which is coupled to any number of remote clients over a local area network (LAN), e.g. an Ethernet network. In an alternative embodiment, the remote clients, 404 and 406, as well as server 401, can be coupled to one another in the information handling system 400 over a wide area network (WAN). Also, the remote/recipient clients, 404 and 406 can be coupled to one another and the server 401 in the information handling system 400 over the public switched telephone network (PSTN), over a WAP network, e.g. rf and satellite microwave, over the Internet or any combination of the same. Again, in reference to FIG. 4, only two remote clients are discussed, e.g. sending remote client 404 and recipient client 406 in order to provide an easier illustration. However, one of ordinary skill in the art will understand upon reading this disclosure that sending client 404 can be coupled to one or more recipient remote clients for transmitting to many remote clients at once versus strictly a one to one relationship. The information handling system 400 with server 401 may further include network connections from the server 401 to printers and other peripheral devices 408 as the same are known and understood by one of ordinary skill in the art.

In the embodiment shown in FIG. 4, the peripheral devices 408 coupled to server 401 are accessible by remote client 406 over a network connection such that electronic data/documents can be communicated to and/or between remote client 406 and the peripheral devices 408 coupled to server 401. As one of ordinary skill in the art will understand upon reading this disclosure, remote client 406 and the peripheral devices 408 coupled to server 401 can access one another via means such as a uniform resource locator (URL) address.

As shown in FIG. 4, the server 401 may comprise part of a network system server which is coupled to additional servers, e.g. servers 410 and 412. In one embodiment according to the teachings of the present invention, the server 401 and additional servers, 410 and 412, include software which provides an appropriate security method for performing the methods of the present invention. In one embodiment, the appropriate security method can include passwords or key access accounts. In another embodiment, the appropriate security method can include data compression software. In another embodiment, the appropriate security method can include encryption software. In still another embodiment, the appropriate security method can include transmission through a network including a fast optical portal. All of the above described can be employed independently or in combination, the invention is not so limited. Thus, in one embodiment, by way of illustration and not by way of limitation, the server 401 and additional servers, 410 and 412, can include a security transmission engine, such as a compression engine, as the same are known and understood by one of ordinary skill in the art. Also, the information handling system 400 can further include a mainframe computer as the same is known and understood by one of ordinary skill in the art.

In all the embodiments discussed above in connection with FIGS. 2, 3, and 4, the information handling system 400 includes a computer with a computer-readable medium having computer-executable instructions to cause the computer to perform methods according to the teachings of the present invention. The computer-readable medium and computer-executable instructions include software for interpreting and executing the computer-executable instructions. The information handling system 400 further includes software means operative on the system 400 to perform methods according to the teachings of the present invention. The software means includes a novel software program, including interface protocols, for carrying out the methods of the present invention. The novel software program according to the teachings of the present invention will be executing on system 400. The software means can be resident on the server 401, or alternatively, the software means can be resident on any number of the storage devices, e.g. computer-readable medium, coupled in system 400.

One of ordinary skill in the art will understand the manner in which a software program can be launched from a computer-readable medium in a computer based system to execute the functions defined in the software program. One of ordinary skill in the art will further understand the various programming languages which may be employed to create a software program designed to implement and perform the methods of the present invention. In one embodiment, the application software is implemented using an object oriented programming language. In one embodiment, the application software makes use of extensible mark-up language (XML), and/or hyper-text mark-up language (HTML) and the like. However, the teachings of the present invention are not limited to a system using the above examples and no embodiment of the invention is limited to a particular programming language or environment.

Methods According to the Present Invention

As explained in connection with FIGS. 1-4, the present invention is implemented using computer based systems which have computer-readable medium for executing instructions from software means, e.g. programs, for carrying out the method embodiments described below. As one of ordinary skill in the art will understand upon reading this disclosure, the functions provided by such execution of such computer-executable instructions can be separated into various program modules stored on the computer-readable medium. In one embodiment, a program module is defined as a software object executing on the computer based system.

In FIGS. 1-4, a system or network which includes a processor and storage device has been presented, e.g. such as contained in one or more servers. As one of ordinary skill in the art will understand upon reading this disclosure, the storage device includes a computer-readable medium having computer-executable instructions. The computer-readable medium is not limited to the storage device, however, and can alternatively be a transportable computer medium in the form of a disk. The computer-readable medium in the storage device, or on a disk, is comprised of a number of databases having a number of database structures. One of ordinary skill in the art will understand upon reading this disclosure the manner in which numerous database structures can be configured within one or more storage devices and networked to communicatively operate with one another and/or a processor.

According to one embodiment of the teachings of the present invention, at least one of the databases includes a database having a data structure which tracks a number of client accounts. Similarly, at least one of the databases includes a data structure which maintains a number of contractual relationships which define the business rules for performing the methods of the present invention. These business rules can include defined coverage relationships in which services can be separated by categories. For example, according to the teachings of the present invention, the electronic transmission of data sets, streaming data, and/or documents can be divided into groups such as: all transmissions of a specific type (e.g. all medical records, purchase orders, legal emails, etc.), all transmissions of a specific size, all transmissions routed through a specific server, all transmissions between a specific sender/receiver pair, all transmissions from a specified sender, all transmissions to a specified receiver, or any combination of the above. Thus, in one embodiment, this database includes a client policy management data structure and is used for performing a client policy management function. The database can further be defined as performing a client relationship management function. The systems and methods of the present invention can further accommodate transmissions which do not fall into a predetermined contractual relationship. Thus, for transmissions which do not fall into a category defined by the contractual relationship, the systems and methods can provide a select coverage rider. The same can be optionally selected using the novel software of the systems and methods of the present invention. It is noted that the services afforded by the systems and methods of the present invention do not require a pre-defined contractual relationship in one of the database structures and that the systems and methods can be used on an ad-hoc basis. However, if such a pre-defined contractual relationship exists in a database of the novel systems, the business rules will be transparent to a user performing a transmission from one remote client to another remote client. In this scenario, the systems and methods, including the novel program configuration, will automatically perform the methods of the present invention without additional user input.

According to one embodiment of the systems and methods of the present invention, at least one database maintains a logging data structure for tracking all transmissions of data sets, streaming data, and/or documents. According to the systems and methods of the present invention, this database maintains a data structure against which all transmission can be verified as transmitted and received or not received. In this manner, this database of the present invention facilitates authenticating the submission of claims covered according to the insuring, bonding, and underwriting aspects of the present invention. In one embodiment, the logging data structure contains only information, such as a header, relating to the transmission and not the data set, streaming data, and/or documents themselves. At least one database maintains a data structure for tracking a claim submission process, and keeps records of all claims for maintaining the integrity of the systems and methods of the insuring, bonding, and underwriting aspects of the present invention. As one of ordinary skill in the art will understand upon reading this disclosure, these databases thus can facilitate data reporting, including statutory reporting, required for the systems and methods of the present invention.

In one embodiment another database, according to the systems and methods of the present invention, includes a marketing, product, and sales management data structure for identifying, analyzing, and tracking potential and previous product sales under the present invention. It further provides a mechanism to provide point of sale support, manage sales campaigns and authority to sell, manage sales incentives and commissions, analyze sales markets and channels, and analyze sales performance. Using the novel software of the present invention, these database tools can be used to track client or customer related activities, analyze client product usage, and analyze profitability under the systems and methods of the present invention. According to the teachings of the present invention, the product is defined herein as the services offered by the systems and methods of the present invention. Also, at least one database includes a financial data structure for tracking all of the business financial processes associated with the insuring, bonding, and underwriting aspects of the present invention. This database thus includes a set of back office software applications for supporting financial accounting functions such as: general ledger (G/L), accounts receivable (A/R), and accounts payable (A/P). Automated interfaces exist between the same and all other processes according to the systems and methods of the present invention. The database and software applications can further provide asset and liability management as well as capital reserves management.

The systems and methods of the present invention can support a number of invoicing configurations dependent upon a given client relationship and the services being used. These invoicing configurations include a per usage charge, e.g., a charge being calculated by various transmission factors such as size, dollar, liability amount, etc. They can also include a flat periodic fee charge, a periodic fee plus additional charge when a number of transmissions and their configuration exceed set values. They can include a periodic fee plus additional charges for specific types of usage, periodic fees minus reimbursement for unused services. Additionally, the A/R can provide an interface to a sales commission process for the product. And, the A/R will provide the interfaces needed to update other back office systems according to the teachings of the present invention, e.g., the G/L and A/P.

The following definitions are provided for purposes of explaining the methods of the present invention. As used herein, the insuring of electronic transmissions for data, streaming data, and documents includes systems and methods for providing an insurance coverage amount payable as an A/P in the event that such information transmitted from one remote client to another remote client, using the systems and methods of the present invention, is not received, e.g., the transmission fails. This function can be preempted by the systems and methods of the present invention when a reason for failure is included as an exclusion based on the contractual relationship as defined by the business rules for the particular transmission. For example, the systems and methods can operate according to the business rules such that a payable is not allocated from the A/P if and when the failure occurs due to operator error at the sending remote client or the receiving remote client. As one of ordinary skill in the art will understand upon reading this disclosure, the systems and methods of the present invention can use the logging data structure for tracking all transmissions of data sets, streaming data, and/or documents to verify whether the transmission was actually received. Those same events can be recorded in the logging database structure. Further, the systems and methods of the present invention may have optionality built in to perform a number of resend attempts upon an initial failure. That same optionality can be built into and defined within the business rules data structure of the present invention.

Further, the systems and methods of the present invention can provide functionality for defining a specific insurance coverage amount, by category, according to the business rules data structure of the present invention. Alternatively, the systems and methods of the present invention can provide the optionality for a user at a remote client to select a desired insurance coverage amount on a per transmission basis.

Additional optionality can be combined with the insuring embodiment of the present invention, as the same is described below. In one embodiment, this can include delivery verification to the sending remote client and/or additional security measures discussed below. In one embodiment, the systems and methods of the present invention can assess an additional charge to a user at the sending remote client for the logging capability of the logging database structure. One of ordinary skill in the art will understand that all of this described functionality can be contained within the computer based system described in connection with FIG. 1.

As used herein, the bonding of electronic transmissions for data, streaming data, and documents includes systems and methods for providing a bonding coverage amount payable as an A/P in the event that such information transmitted from one remote client to another remote client, using the systems and methods of the present invention, is not received, e.g. the transmission fails. Again, this function can be preempted by the systems and methods of the present invention when a reason for failure is included as an exclusion based on the contractual relationship as defined by the business rules for the particular transmission as described above. As one of ordinary skill in the art will understand upon reading this disclosure, the systems and methods of the present invention use the logging data structure for tracking all transmissions of data sets, streaming data, and/or documents to verify whether the transmission was actually received. As before, the systems and methods of the present invention may have optionality built in to perform a number of resend attempts upon an initial failure. That same optionality can be built into and defined within the business rules data structure of the present invention. Similarly, the systems and methods of the present invention can provide functionality for defining a specific bond coverage amount, by category, according to the business rules data structure of the present invention. Alternatively, the systems and methods of the present invention can provide the optionality for a user at a remote client to select a desired bond coverage amount on a per transmission basis. According to the teachings of the present invention, the financial database structure of the present invention tracks and allocates sufficient funds to back the selected bond coverage amount. Additional optionality can be combined with the bonding embodiment of the present invention, as the same is described below. In one embodiment, this can include delivery verification to the sending remote client. and/or additional security measures discussed below. In one embodiment, the systems and methods of the present invention can assess an additional charge to a user at the sending remote client for the logging capability of the logging database structure. One of ordinary skill in the art will understand that all of this described functionality can be contained within the computer based system described in connection with FIG. 1.

As used herein, the underwriting of electronic transmissions for data, streaming data, and documents includes systems and methods for providing an underwriting coverage amount payable as an A/P in the event that such information transmitted from one remote client to another remote client, using the systems and methods of the present invention, is not received, e.g. the transmission fails. Again, this function can be preempted by the systems and methods of the present invention when a reason for failure is included as an exclusion based on the contractual relationship as defined by the business rules for the particular transmission as described above. As one of ordinary skill in the art will understand upon reading this disclosure, the systems and methods of the present invention use the logging data structure for tracking all transmissions of data sets, streaming data, and/or documents to verify whether the transmission was actually received. Further, the systems and methods of the present invention may have optionality built in to perform a number of resend attempts upon an initial failure. That same optionality can be built into and defined within the business rules data structure of the present invention. Similarly, the systems and methods of the present invention can provide functionality for defining a specific underwriting coverage amount, by category, according to the business rules data structure of the present invention. Alternatively, the systems and methods of the present invention can provide the optionality for a user at a remote client to select a desired underwriting coverage amount on a per transmission basis. Additional optionality can be combined with the insuring embodiment of the present invention, as the same is described below. In one embodiment, this can include delivery verification to the sending remote client and/or additional security measures discussed below. In one embodiment, the systems and methods of the present invention can assess an additional charge to a user at the sending remote client for the logging capability of the logging database structure. One of ordinary skill in the art will understand that all of this described functionality can be contained within the computer based system described in connection with FIG. 1.

The definitions above have referred to an event of transmission failure. However, one of ordinary skill in the art will understand upon reading this disclosure that the above definitions defining functional methods of the present invention can operate in a similar fashion for events where the transmission has been mis-received, intercepted, interfered or tampered with by outside sources or un-intended recipients. The computer-executable instructions on the computer-readable medium include one or more software programs. One of ordinary skill in the art will further understand the various programming languages, such as object oriented programming and the like, which can be used to create the one or more programs. The invention is not so limited. Neither is the present invention limited to a specific set of protocols. One of ordinary skill in the art will understand upon reading this disclosure, the various numbers of protocols which can be employed in the system or network of the present invention to perform the methods described in the present invention. The processor can execute the computer-readable instructions contained in the described computer-readable medium to perform the methods of the present invention. The following include embodiments of the present invention employing a computer-readable medium having computer-readable instructions for performing a method for insuring, bonding, and underwriting the electronic transmission of data sets, streaming data, and documents over the Internet.

These embodiments of the present invention include systems and methods for insuring, bonding, and underwriting the transmission of documents and data, including streaming data, over the Internet through TCP/IP and all other electronic media such as WAP (wireless application protocol), VOIP (voice-over IP), fiber optic channels, microwave channels, and through standard electrical switches, electrical outlets, powerlines, etc. These embodiments further include methods for facilitating electronic commerce and providing associated individual and organizational services. The scope of the present invention includes other method embodiments which will be understood by one of ordinary skill in the art upon reading this disclosure.

In particular, one such additional method embodiment includes novel software including a number of program modules or components located on a server within the system for creating and populating a contractual relationship database for a particular client. In other words, in one embodiment, the systems and methods provide for the creation and management of a particular policy and policy management for a particular client. One of ordinary skill in the art will understand upon reading this disclosure that the various embodiments include novel software including a number of program modules or components located on the computer based system or network of the present invention, e.g. servers, sending remote clients, and receiving remote clients, for facilitating the methods of the present invention.

The system explained in connection with FIGS. 1-4, comprises a server having a processor, a storage device coupled to the processor, and software means operative on the processor, e.g. system collectively. In other words, the invention includes a program stored on a computer-readable medium, such as the storage device. The program includes computer-executable instructions which can be operated on by the processor. The system more broadly includes the server, connectively coupled to remote clients having client programs, and additional servers and systems, with the software means, e.g. software program executing on the system. The software program will enable the methods described below.

One method embodiment of the present invention is explained in reference to FIG. 2. This method embodiment employs the software means operating on the system to enable a user at a remote client to insure, bond, and/or underwrite the transmission of any electronic data, including streaming data, or any electronic document over a communication network, e.g., rf, satellite, the Internet or a communication network including a combination thereof. According to the teachings of this embodiment the software means operating on the system insures, bonds and underwrites the transmission of all data, including streaming data, and all electronic documents for a fee based on a user's selected coverage type and for a selected coverage amount from a first remote client to a second remote client. According to the teachings of the present invention, the user is charged a fee for the service of the systems and methods of the present invention.

According to the teachings of the present invention, a selected coverage can include using the systems and methods of the present invention solely to insure a transmission of a data set, including streaming data, or a document. According to the teachings of the present invention, a selected coverage can include using the systems and methods of the present invention solely to bond a transmission of a data set, including streaming data, or a document.

According to the teachings of the present invention, a selected coverage can include using the systems and methods of the present invention solely to underwrite a transmission of a data set, including streaming data, or a document. And, according to the teachings of the present invention, a selected coverage can include using the systems and methods of the present invention to perform any combination of the above listed functions in relation to a transmission of a data set, including streaming data, or a document. The systems and methods of the present invention thus include a novel program which optionally provides a function or number of functions chosen as the selected coverage, and applies an appropriate fee for the selected coverage to an appropriate account, an identified account, a specified account, a designated account, etc.

For example, in one embodiment, the software means operating on the system can use an insurance application script, unique tracking ID, or insured transmission mechanism designed to automatically attach a license for registration and insurance purposes to a user's electronic data set, including streaming data, or a document sent from a remote client to another remote client. According to the teachings of the present invention. The insured transmission mechanism, which is used equally for the insuring, bonding, and underwriting embodiments, identifies a transmission as insured, bonded, and/or underwritten, and contains tracking and security components as defined by the business rules in the business rules database structure for a particular transmission. In effect, the insurance application script is used to track the transmission of the data set, streaming data, or document to an intended destination at a remote client as well as to apply an appropriate fee for the selected coverage to an appropriate account. The insured transmission mechanism is integral with all of the program modules and software/protocols of the system for the present invention.

According to the teachings of this method embodiment, a user at a remote client having a client program addresses the system server, as described in FIG. 2, over a communication network. For example, the user at the remote client having a client program can address the system server, e.g. using a URL address or generally accessing a website for the server over the Internet. Using the system and methods of the present invention, the user at a remote client having a client program can then electronically transmit a signal over the communication network representing a request that an identified data set, streaming data set, or an identified document be transmitted to a designated destination, e.g. another remote client. In one embodiment, transmitting a signal representing a request accesses an online insurance, bonding, or underwriting document which includes an electronic account form. According to the teachings of the present invention, the method includes having the user complete an electronic account form using the software means and/or client program. In this embodiment, the user includes data which represent a location of the remote client and an address to which an identified data set, streaming data set, or an identified document is to be transmitted. Using the systems and methods of the present invention, a selected coverage is chosen, e.g. insurance, bonding, underwriting, or any combination of the same as described above. For example, in one embodiment, an identified data set, streaming data set, or an identified document is insured and bonded for transmission over the Internet. Also, in this embodiment, data is entered into a set of fields on the electronic account form such that the user at the remote client uses the software means and the client program to select an amount of coverage per coverage type, e.g. insuring, bonding, and/or underwriting. According to the teachings of the present invention, the systems and methods include optionality for selecting different amounts of coverage within each selected coverage type in order to cover different subsets of the data set(s), streaming data, and/or documents being transmitted. Again, according to the systems and methods of the present invention, the business rules can define the same.

According to the teachings of this method embodiment, transmission of the document is a permission activated event such that once the user at the remote client submits data representing the electronic data set, streaming data, or document to be transmitted to another remote client, the transmission is authorized and the software means provides the insuring, bonding, and/or underwriting, depending on the selected coverage, and assesses a fee to an appropriate account of the user at the remote client, or a designated account, e.g. sending a client fee.

As one of ordinary skill in the art will understand upon reading this disclosure, the above described method of accessing an electronic form is not required where the contractual relationship database already contains defined business rules for transmissions from that particular client. In this scenario, the electronic form is transparent to a user at the remote client. However, a user at the remote client can still access the same, using the novel software of the present invention for purposes of augmenting or amending a set of specifics relating to a particular transmission, e.g. obtaining a select coverage rider.

Another method embodiment of the present invention is explained in reference to FIG. 3. This method embodiment employs the software means operating on the system to enable a user at a remote client to insure and certify the transmission of any data set, streaming data, or electronic document over a communication network, e.g. a communication network including rf, satellite, the Internet or any combination thereof. According to this embodiment, the term "certify" is intended to include a delivery verification. According to the teachings of this embodiment the software means operating on the system insures, bonds, underwrites and verifies delivery for the transmission of all data sets, streaming data, or electronic documents for a fee based on a user's selected/desired coverage. Again, the user is charged a fee upon the transmission of the insured, bonded and/or underwritten data sets, streaming data, or electronic documents. For example, the software means operating on the system can use an insurance application script designed to automatically attach a license for registration and insurance purposes to a user's electronic data set, streaming data, or document sent from a remote client as the same has been described in more detail above. The insurance application script includes the same as described above and similarly referred to as the insured transmission mechanism. However, in this embodiment in addition to the functionality described above, the software means operating on the system electronically transmits a delivery verification as data representing a successful transmission of the data set, streaming data, or document to an intended recipient at another remote client. In one embodiment, the delivery verification can be termed as a return receipt; however, the present invention is not so limited. In other words, the delivery verification provided by the systems and methods of the present invention can consist of more than a return receipt notice.

In this embodiment as shown in FIG. 3, the software means electronically communicates an automatic-reply over a communications network back to the system server for a delivery verification. One of ordinary skill in the art will understand upon reading this disclosure that the same delivery verification can be stored in the logging database structure described above using the systems and methods of the present invention. In one embodiment, by way of example and not by way of limitation, the delivery verification can be termed a certified or certification verification. An account of the sending user/remote client, or other appropriate account, charged a fee upon the transmission of the insured, bonded and/or underwritten data sets, streaming data, or electronic documents. In this embodiment, the sending user/remote client is electronically provided over the communication network with a delivery verification. Again, in one embodiment by way of example and not by way of limitation the delivery verification may include a return receipt.

According to the teachings of this method embodiment, a user at a remote client having a client program addresses the system server, as described in FIG. 3, over a communication network. For example, the user at the remote client having a client program can address the system server, e.g. using a URL address or generally accessing the website for the server over the Internet. The user at a remote client having a client program then electronically transmits data over the communication network representing a request that a user data set, streaming data, and/or document be insured, bonded, and/or underwritten for transmission over the Internet. In one embodiment, the method includes having the user complete an on-line electronic form using the software means and/or client program. In one embodiment, the completing the on-line electronic form includes creating an on-line insurance policy. According to the teachings of the present invention, the on-line electronic form includes a number of data fields for entering information. In one embodiment, the on-line electronic form includes an electronic account form which further includes a number of data fields for entering information for an appropriate account. In one embodiment, the on-line electronic form includes a number of linked web pages which have a number of data fields for entering information. In one embodiment, one or more of the number of linked web pages can include an example or a template, or optionality for creating an on-line insurance policy. In one embodiment, one or more of the number of linked web pages can include an electronic account form having a number of data fields for entering information for an appropriate account. In one embodiment, a user at a remote client can include data which represent a location, e.g. URL address, of the remote client and an address, e.g. another URL address, for another remote client to which a data set, streaming data, and/or document is to be transmitted. In one embodiment, a user at the remote client uses the software means and client program to select an amount of coverage per coverage type, e.g. insuring, bonding, and/or underwriting, as described herein. According to the teachings of the present invention, the systems and methods include optionality for selecting different amounts of coverage within each selected coverage type in order to cover different subsets of the data set(s), streaming data, and/or documents being transmitted. For example, a user can define that all medical records transmitted from the remote client be insured for a coverage amount of $300 per transmission, and that all X-rays transmitted from the remote client be insured for a coverage amount of $500 per transmission. Again, according to the systems and methods of the present invention, the business rules can define the same.

According to the teachings of this method embodiment, the user at the sending remote client can electronically transmit data representing a request for a delivery verification. In one example, by way of illustration and not by way of limitation the delivery verification is in the form of an electronic return receipt. However, according to the teachings of the present invention, the delivery verification can include electronic data and information beyond a return receipt notification. That is, according to the teachings and methods of the present invention, the systems and methods can provide a wide variety of data and information back to the sending remote client based on a number of delivery verification request formats optioned by the sending remote client using the program of the present invention. In one embodiment, the user at the remote client having a client program can electronically transmit data representing a delivery verification request format by activating a data field on the electronic form. Again, according to the teachings of the present invention, the delivery verification request format can include a request for a detailed set of delivery verification information, or alternatively, can include a request for an electronic return receipt. The invention is not so limited. When the delivery verification request step is performed, or selected by the user using the systems and methods of the present invention, the software means, or program activates an automatic tracking software application for the data set, streaming data, and/or document to be transmitted.

According to the teachings of this method embodiment, transmission of the document is a permission activated event such that once the user at the remote client submits data representing the electronic data set, streaming data, and/or document to be transmitted to another remote client, the transmission is authorized and the software means, or program provides the selected coverage and selected coverage amount and assesses or charges a fee to an appropriate account upon transmission of the data set, streaming data, and/or document, as the same has been described above. In this embodiment, the software means will generate a delivery verification and electronically provide the delivery verification to the sending user/remote client over the communication network.

As one of ordinary skill in the art will understand upon reading this disclosure, the above described method of accessing an electronic form is not required where the contractual relationship database already contains defined business rules for transmissions from that particular client. In this scenario, the electronic form is transparent to a user at the remote client. However, a user at the remote client can still access the same, using the novel software of the present invention for purposes of augmenting or amending a set of specifics relating to a particular transmission, e.g. obtaining a select coverage rider.

Another method embodiment of the present invention is explained in reference to FIG. 4. This method embodiment employs the software means, or program, operating on the system to enable a user at a remote client to insure, bond, and underwrite the transmission of any electronic data set, streaming data, and/or document over a communication network, e.g. a communication network including rf, satellite, and Internet connections or any combination of the same. However, this embodiment incorporates additional security optionality as discussed and described above. In other words, FIG. 4 illustrates a duplication and replication embodiment for a transmission using the systems and methods of the present invention. According to the teachings of this embodiment, the software means operating on the system insures, bonds, and/or underwrites the transmission of all electronic data sets, streaming data, and/or documents for a fee based on a user's selected/desired coverage. As described in detail above, the user is charged a fee for transmission of the insured, bonded and underwritten data set, streaming data, and/or document based on the selected coverage type and a selected an amount. As mentioned above, according to the teachings of the present invention, the systems and methods include optionality for selecting different amounts of coverage within each selected coverage type in order to cover different subsets of the data set(s), streaming data, and/or documents being transmitted. Thus, according to the teachings of the present invention, the systems and methods are operable for sending data sets, streaming data, and/or documents which are insured over a range of insurance amounts. That is, the transmission of the data set, streaming data, and/or document can includes a first portion of the data set, streaming data, and/or document insured at a first insurance amount and another portion insured at a second insurance amount and so forth. For example, a user can define that all medical records transmitted from the remote client be insured for a coverage amount of $300 per transmission, and that all X-rays transmitted from the remote client be insured for a coverage amount of $500 per transmission. The invention is not so limited. In these instances, the software means operating on the system uses an appropriate insurance application script, as described above, designed to automatically attach a license for registration and insurance purposes to a user's electronic data set, streaming data, and/or document sent from a remote client.

The appropriate insurance application script, or insured transmission script accounts for the various insurance amounts. Again, according to the systems and methods of the present invention, the business rules can define the same.

Further, as explained in detail above in other embodiments, the software means operating on the system also can provide delivery verification. In one embodiment, the software means operating on the system provides an insured delivery verification. In one embodiment, the software means operating on the system provides a bonded delivery verification. In another embodiment, the software means operating on the system provides an underwritten delivery verification. That is the software means operating on the novel system can electronically transmit data representing the successful transmission of the data set, streaming data, and/or document to an intended recipient at another remote client as a delivery verification. As shown in FIG. 4, the software means can electronically communicate an automatic-reply over a communications network back to the system server for verification. In one embodiment, by way of example and not by way of limitation, the system server performs an initial delivery verification. In one embodiment, according to the teachings of the present invention, this delivery verification performed by the system server can be termed a certification verification. An account of the sending user/remote client is charged a fee upon transmission of the insured, bonded, and/or underwritten data set, streaming data, and/or document. And, as described above, the sending remote client is electronically provided with a delivery verification over the communication network. According to the teachings of this method embodiment, a user at a remote client having a client program addresses the system server, as described in FIG. 4, over a communication network. For example, the user at the remote client having a client program can address the system server, e.g. using a URL address or generally accessing a website for the server over the Internet. The user at a remote client having a client program can then electronically transmit data over the communication network representing a request that a user document be insured and bonded for transmission over the Internet. In one embodiment, the method includes having the user complete an electronic form using the software means and/or client program. The electronic form includes the electronic form as discussed and described in detail above, in this embodiment, the user includes data which represent a location of the sending remote client and an address of a recipient remote client to which the document is to be transmitted. In one embodiment, the user at the remote client uses the software means and client program to select an amount, or first amount, of insurance coverage for the document transmittal. As explained in detail above, a range of, and multiple, insurance amounts can be selected using the systems and methods of the present invention.

Again, as explained above, the method of accessing an electronic form and entering data specific to locations of the sending and recipient client is not required where the contractual relationship database already contains defined business rules for transmissions from that particular client. In this scenario, the electronic form is transparent to a user at the remote client. However, a user at the remote client can still access the same, using the novel software of the present invention for purposes of augmenting or amending a set of specifics relating to a particular transmission, e.g. obtaining a select coverage rider.

In the embodiment of FIG. 4, the systems and methods of the present invention employ additional functionality for duplication and replication of the transmission of the data set, streaming data, and/or document to an intended recipient at another remote client. In one embodiment using the systems and methods of the present invention, the user at the remote client can even use the software means to select how long the data set, streaming data, and/or document may reside at the recipient remote client's location. Additionally, in one embodiment using the systems and methods of the present invention, the user at the remote client can use the software means to select a set of additional security measures, e.g. compression, encryption, fast optical portals, etc., as described in detail above. That is in one embodiment, by way of example and not by way of limitation, the data set, streaming data, and/or document is secured using the software means and a security transmission engine, such as a compression engine. The embodiment shown in FIG. 4 employs the duplication and replication methodology available in the systems and methods of the present invention, e.g. capabilities contained in servers 410 and 412. The invention, however, is not so limited and other appropriate security measures can be selected using the systems and methods of the present invention, as one of ordinary skill in the art will understand the same upon reading this disclosure.

As mentioned above, according to the teachings of this method embodiment, other functionality of offering the user at the sending remote client the ability to electronically transmit data representing a return receipt request is still present in the embodiment of FIG. 4. But in addition, in the embodiment of FIG. 4, the user at the remote client having a client program can electronically transmit data representing a request to secure the data set, streaming data, and/or document by activating a data field on the electronic form. The software means can provide the user at the remote client with a number of reasons, e.g. an advice notification, listing why the user at the remote client may want to secure the data set, streaming data, and/or document based. As one of ordinary skill in the art will understand upon reading this disclosure, the program according to the systems and methods of the present invention can tailor the advice notification responsive to a type or a class of the data set, streaming data, and/or document which is to be transmitted. Once the data set, streaming data, and/or document is secured, using the systems and methods of the present invention, the user may further electronically transmit data representing a request to create a copy of the data set, streaming data, and/or document, using the software means, for storage on the a server network, e.g. an archive server, by activating a data field on the electronic form. According to the teachings of the present invention, the method can include exchanging the data set, streaming data, and/or document with the archive server through an exchange server as part of the server network.

According to the teachings of this method embodiment, the user at the sending remote client can electronically transmit data representing a delivery verification request. In one embodiment, the user at the remote client having a client program can electronically transmit data representing a delivery verification request by activating a data field on the electronic form. When this step is performed by the user, the software means activates an automatic tracking software application for the data set, streaming data, and/or document to be transmitted.

According to the teachings of this method embodiment, transmission of the document is permission activated such that once the user at the remote submits data representing the electronic data set, streaming data, and/or document to be transmitted to another remote client, the transmission is authorized and the software means provides the insurance, bonding, and/or underwriting coverage and assesses or charges a fee to the user at the sending remote client, e.g. a sending client fee, as the same has been described above.

According to the teachings of this method embodiment, the software means operating on the system further allows the recipient remote client to electronically access the document from the system server network, e.g. servers 410 and 412, using a file access key if the recipient remote client is unable to open the electronic document initially at their location. An example of a file access key includes a user name and password, or unique identifier. Also, in this embodiment, the software means is operable for copying and exchanging the document through an exchange server, e.g. servers 410 and 412, to the network system server when the electronic document is transmitted or sent.

CONCLUSION

Thus, systems and methods have been provided which provide a technical application for insuring, bonding, and underwriting a transmission of a data set, streaming data, and/or document over the Internet through TCP/IP and all other electronic media such as WAP (wireless application protocol), VOIP (voice-over IP), fiber optic channels, microwave channels, and through standard electrical switches, electrical outlets and power lines. The technical application of the present invention fills a technical need which has not been heretofore met. The present invention includes a computer-readable medium having computer-executable instructions to cause a system perform a method for insuring, bonding, and/or underwriting data transmission. The method includes enabling a first remote client coupled to a communications network to insure, bond, and/or underwrite a transmission of an electronic data set, streaming data, and/or document, with a selected coverage type for a selected coverage amount, from the first remote client to one or more second remote clients. The method further includes charging a fee to an appropriate account for the selected coverage type and coverage amount. Thus, the systems and methods of the present invention include a technical application which provides a solution to the heretofore unresolved problem of insuring, bonding, and/or underwriting transmission of data sets, streaming data, and/or documents over the Internet.

What is claimed is:

1. A computerized method for providing coverage for computerized transmission of data, the method comprising:
   requesting coverage for transmission, from a sender computer to a server computer, of a set of data over a communications network, wherein the coverage specifies a payment amount to be paid if the transmission were to fail, and wherein, based on the coverage, the server computer provides a payment of the payment amount if the transmission fails;
   causing, by the server computer, computerized payment of a fee to a specified account for the coverage of the transmission;
   sending, from the sender computer, a status indication for logging that the transmission of the set of data is occurring; and
   transmitting the set of data from the sender computer to a receiver computer.

2. The method of claim 1, wherein the requesting includes eliciting and receiving data and placing the received data in an on-line electronic form.

3. The method of claim 2, wherein the eliciting and receiving of data includes eliciting and receiving information for an appropriate account and placing the received information in a number of data fields located on the on-line electronic form.

4. The method of claim 1, wherein the requesting includes selecting an amount of coverage per a coverage type.

5. The method of claim 1, wherein the causing computerized payment of the fee includes causing computerized payment of a per-usage fee, and wherein the fee is based upon a size of the transmission, a monetary value of the transmission, and a liability amount of the transmission.

6. The method of claim 1, wherein the causing computerized payment of the fee includes causing computerized payment of a flat periodic fee.

7. The method of claim 1, wherein the transmission of the set of data is one of a number of transmissions, and the causing computerized payment of the fee includes causing computerized payment of a flat periodic fee plus an additional fee when the number of transmissions exceeds a predetermined number.

8. An apparatus comprising:
   a requestor configured to request coverage for transmission of a set of data over a communications network, wherein the coverage would provide a payment amount if the transmission were to fail;
   a payment module operatively coupled to the requestor and configured to pay a fee for the coverage;
   a status-indication unit operatively coupled to the requestor and configured to send a status indication for logging that the transmission of the set of data is occurring; and
   a transmission unit operatively coupled to the requestor and configured to perform the transmission of the set of data.

9. The apparatus of claim 8, wherein the requestor is configured to complete an on-line electronic form.

10. The apparatus of claim 9, wherein the requestor is configured to enter information for an appropriate account by filling out a plurality of data fields located on the on-line electronic form.

11. The apparatus of claim 8, wherein the requestor is configured to select an amount of coverage per a coverage type.

12. The apparatus of claim 8, wherein the payment module is configured to pay a per-usage fee, and wherein the fee is based upon a size of the transmission, a monetary value of the transmission, and a liability amount of the transmission.

13. The apparatus of claim 8, wherein the payment module is configured to pay a flat periodic fee.

14. The apparatus of claim 8, wherein the transmission of the set of data is one of a number of transmissions, and the payment module is configured to pay a flat periodic fee plus an additional fee when the number of transmissions exceeds a predetermined number.

15. An apparatus for providing coverage for computerized transmission of data, the apparatus comprising:
   means for requesting coverage for transmission, from a sender computer, of a set of data over a communications network, wherein the coverage would provide a payment amount if the transmission were to fail;

means for paying a fee for the coverage;

means for sending, from the sender computer, a status indication for logging that the transmission of the set of data is occurring; and means for performing the transmission of the set of data.

16. The apparatus of claim 15, wherein the means for requesting includes means for selecting an amount of coverage per a coverage type, and wherein the means for selecting includes an on-line electronic form.

17. The apparatus of claim 16, wherein the means for requesting includes means for entering information for an appropriate account by filling out a number of data fields located on the on-line electronic form.

18. The apparatus of claim 15, wherein the means for paying includes means for paying a per-usage fee, and wherein the fee is based upon a size of the transmission, a monetary value of the transmission, and a liability amount of the transmission.

19. The apparatus of claim 15, wherein the means for paying includes means for paying a flat periodic fee.

20. The apparatus of claim 15, wherein the transmission of the set of data is one of a number of transmissions, and the means for paying includes means for paying a flat periodic fee plus an additional fee when the number of transmissions exceeds a predetermined number.

* * * * *